US009097167B2

(12) United States Patent
Tanaka et al.

(10) Patent No.: US 9,097,167 B2
(45) Date of Patent: Aug. 4, 2015

(54) EXHAUST GAS PURIFICATION DEVICE OF INTERNAL COMBUSTION ENGINE

(75) Inventors: Hiroshi Tanaka, Susono (JP); Yusuke Saito, Susono (JP); Takeshi Nobukawa, Susono (JP); Masao Watanabe, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/362,444

(22) PCT Filed: Dec. 7, 2011

(86) PCT No.: PCT/JP2011/078237
§ 371 (c)(1),
(2), (4) Date: Jun. 3, 2014

(87) PCT Pub. No.: WO2013/084307
PCT Pub. Date: Jun. 13, 2013

(65) Prior Publication Data
US 2014/0331652 A1 Nov. 13, 2014

(51) Int. Cl.
*F01N 3/00* (2006.01)
*F01N 11/00* (2006.01)
(Continued)

(52) U.S. Cl.
CPC ....... *F01N 11/00* (2013.01); *F01N 9/00* (2013.01); *F01N 11/007* (2013.01);
(Continued)

(58) Field of Classification Search
CPC ... F01N 3/0842; F01N 3/2066; F01N 3/2053; F01N 3/0871; F01N 3/0878; F01N 13/02; F01N 2610/02; F01N 2610/03; F02D 41/0275; F02D 41/1441; F02D 41/0295
USPC ............ 60/274, 285, 286, 287, 301; 422/168, 422/169, 170, 171, 172, 177; 502/327, 328
See application file for complete search history.

(56) References Cited

U.S. PATENT DOCUMENTS

2004/0115104 A1* 6/2004 Iizuka et al. ................. 422/177
2005/0049143 A1 3/2005 Eguchi et al.
(Continued)

FOREIGN PATENT DOCUMENTS

JP 09248458 A * 9/1997 ............... B01J 23/58
JP 2000140638 A * 5/2000 ............... B01J 23/58
(Continued)

OTHER PUBLICATIONS

Machine Translation of JP 2006-183624, Translated on Nov. 19, 2014.*

*Primary Examiner* — Thomas Denion
*Assistant Examiner* — Patrick Maines
(74) *Attorney, Agent, or Firm* — Sughrue Mion, PLLC

(57) ABSTRACT

The invention relates to an exhaust gas purification device of an internal combustion engine comprising a catalyst (45) having an active element and a composite oxidation which carries the active element in an exhaust passage (40), the active element transforming into the composite oxide as a solid solution when the catalyst temperature is higher than or equal to a predetermined solid solution temperature and the atmosphere of the interior of the catalyst is an oxidation atmosphere and the active element precipitating from the composite oxide when the catalyst temperature is higher than or equal to a predetermined precipitation temperature and the atmosphere of the interior of the catalyst is a reduction atmosphere. According to the invention, in case that the performance of the fuel supply stop control is inhibited when the catalyst temperature is higher than or equal to the performance inhibiting temperature, a temperature lower than a base temperature of the performance inhibiting temperature is set as the performance inhibiting temperature while the use degree of the catalyst is lower than or equal to a predetermined degree and in case that the performance of the fuel supply amount increase control is permitted when the catalyst temperature is higher than or equal to a performance permitting temperature, a temperature higher than a base temperature of the performance permitting temperature is set as the performance permitting temperature while the use degree of the catalyst is smaller than or equal to the predetermined degree.

3 Claims, 7 Drawing Sheets

(51) Int. Cl.
  *F01N 9/00* (2006.01)
  *F02D 41/12* (2006.01)
  *B01D 53/94* (2006.01)
  *F02D 41/02* (2006.01)

(52) U.S. Cl.
  CPC ......... *F02D 41/123* (2013.01); *B01D 53/9445* (2013.01); *B01D 53/9495* (2013.01); *F01N 2430/06* (2013.01); *F01N 2550/02* (2013.01); *F01N 2900/1602* (2013.01); *F01N 2900/1624* (2013.01); *F02D 2041/0265* (2013.01); *F02D 2200/0802* (2013.01); *F02N 2200/026* (2013.01); *Y02T 10/22* (2013.01); *Y02T 10/47* (2013.01)

(56) References Cited

U.S. PATENT DOCUMENTS

| | | | |
|---|---|---|---|
| 2007/0004589 A1* | 1/2007 | Kimura et al. | 502/302 |
| 2009/0131251 A1* | 5/2009 | Matsueda et al. | 502/303 |
| 2009/0314267 A1 | 12/2009 | Kawai et al. | |
| 2010/0093526 A1* | 4/2010 | Tanaka et al. | 502/327 |
| 2011/0165045 A1* | 7/2011 | Ikeda et al. | 423/213.2 |
| 2014/0202138 A1* | 7/2014 | Tanaka et al. | 60/286 |
| 2014/0331649 A1* | 11/2014 | Tanaka | 60/277 |

FOREIGN PATENT DOCUMENTS

| | | | | |
|---|---|---|---|---|
| JP | 2000189799 A | * | 7/2000 | B01J 23/58 |
| JP | 2005-066559 A | | 3/2005 | |
| JP | 2005199195 A | * | 7/2005 | B01J 23/58 |
| JP | 2006-183624 A | | 7/2006 | |
| JP | 2006183624 A | * | 7/2006 | |
| JP | 2008-012480 A | | 1/2008 | |
| JP | 2008-051063 A | | 3/2008 | |
| JP | 2012-239942 A | | 12/2012 | |
| WO | 2008/096575 A1 | | 8/2008 | |

* cited by examiner (A)

(B)

EXHAUST GAS PURIFICATION DEVICE OF INTERNAL COMBUSTION ENGINE

CROSS REFERENCE TO RELATED APPLICATIONS

This is a National Stage of International Application No. PCT/JP2011/078237 filed Dec. 7, 2011, the contents of which are incorporated herein by reference in its entirety.

TECHNICAL FIELD

The invention relates to an exhaust gas purification device of an internal combustion engine.

BACKGROUND ART

A catalyst for purifying components included in an exhaust gas discharged from a combustion chamber of an internal combustion engine is described in the Patent Literature 1. This catalyst has an active element (that is, an element for activating an oxidation reaction or a reduction reaction of the components included in the exhaust gas) and a composite oxide comprising a composite oxide which carries the active element. Further, this catalyst has a property that the active element transforms into the composite oxide as a solid solution when an atmosphere of the interior of the catalyst is an oxidation atmosphere and the active element precipitates from the composite oxide when the atmosphere of the interior of the catalyst is a reduction atmosphere.

CITATION LIST

Patent Literature

[PATENT LITERATURE 1] WO2008/096575
[PATENT LITERATURE 2] JP 2006-183624 A
[PATENT LITERATURE 3] JP 2008-12480 A
[PATENT LITERATURE 4] JP 2005-66559 A
[PATENT LITERATURE 5] JP 2008-51063 A

SUMMARY OF INVENTION

Problem to be Solved

A catalyst purification ability (that is, an ability of the catalyst for purifying the components included in the exhaust gas) changes depending on a catalyst use degree such as a catalyst use time (that is, a sum of the time of the use of the catalyst for purifying the components included in the exhaust gas). Therefore, in order to obtain a desired performance of the engine, it is necessary to perform an engine control (that is, a control relating to the engine) in consideration of the change of the catalyst purification ability or it is necessary to establish a control logic used in the engine control in consideration of the change of the catalyst purification ability. However, such a performance of the engine control and such an establishment of the control logic are cumbersome.

The object of the invention is to provide an exhaust gas purification device of an internal combustion engine which can perform the engine control relatively simply, establish the control logic used in the engine control relatively easily and obtain a desired purification ability of the catalyst.

Means for Solving the Problem

The invention of this application for accomplishing the aforementioned object relates to an exhaust gas purification device of an internal combustion engine comprising a catalyst for purifying a component included in an exhaust gas in an exhaust passage, which catalyst having an active element for activating an oxidation reaction or a reduction reaction of the component included in the exhaust gas and a composite oxide which carries the active element, the active element transforming into the composite oxide as a solid solution when a temperature of the catalyst is higher than or equal to a predetermined solid solution temperature which is a predetermined temperature and an atmosphere of an interior of the catalyst is an oxidation atmosphere and the active element precipitating from the composite oxidation when the temperature of the catalyst is higher than or equal to a predetermined precipitation temperature which is a predetermined temperature and the atmosphere of the interior of the catalyst is a reduction atmosphere.

According to the invention, in case that the engine can perform a fuel supply stop control for stopping a supply of a fuel to a combustion chamber and the performance of the fuel supply stop control is inhibited when the temperature of the catalyst is higher than or equal to a performance inhibiting temperature which is a predetermined temperature and the performance of the fuel supply stop control is permitted when the temperature of the catalyst is lower than the performance inhibiting temperature, a temperature lower than a base temperature of the performance inhibiting temperature is set as the performance inhibiting temperature while a use degree of the catalyst is smaller than or equal to a predetermined degree.

Otherwise, according to the invention, in case that the engine can perform a fuel supply amount increase control for increasing an amount of the supply of the fuel to the combustion chamber beyond a base amount and the performance of the fuel supply amount increase control is permitted when the temperature of the catalyst is higher than or equal to a performance permitting temperature which is a predetermined temperature and the performance of the fuel supply amount increase control is inhibited when the temperature of the catalyst is lower than the performance permitting temperature, a temperature higher than a base temperature of the performance permitting temperature is set as the performance permitting temperature while the use degree of the catalyst is smaller than or equal to a predetermined degree.

According to the invention, the following effect can be obtained. That is, when the fuel supply stop control is performed, a catalyst flow-in exhaust air-fuel ratio (that is, an air-fuel ratio of the exhaust gas flowing into the catalyst) becomes leaner than the stoichiometric air-fuel ratio and as a result, the atmosphere of the interior of the catalyst becomes the oxidation atmosphere. In this case, when the catalyst temperature becomes relatively high, the agglomeration of the composite oxide occurs and as a result, the catalyst purification ability changes. On the other hand, when the fuel supply amount increase control is performed, the catalyst flow-in exhaust air-fuel ratio becomes richer than the stoichiometric air-fuel ratio and as a result, the atmosphere of the interior of the catalyst becomes the reduction atmosphere. In this regard, in case that the catalyst has a property that the active element precipitates from the composite oxide when the catalyst temperature is higher than or equal to the predetermined precipitation temperature and the atmosphere of the interior of the catalyst is the reduction atmosphere, the active element precipitates from the composite oxide when the catalyst temperature becomes higher than the predetermined precipitation temperature. Therefore, the amount of the precipitating active element (that is, the active element precipitating from the composite oxide) changes and as a result, the catalyst purification ability changes.

On the other hand, in order to obtain the desired performance of the engine, it is necessary to establish the control logic used in the engine control and perform the engine control such that the desired performance of the engine can be obtained in consideration of the change of the catalyst purification ability during the engine operation. However, in case that the catalyst purification ability changes due to the performance of the fuel supply stop control or the fuel supply amount increase control, it is very cumbersome to establish the control logic and perform the engine control as described above. Also, while the use degree of the catalyst is relatively small, the deterioration of the catalyst does not progress and therefore, it is not necessary to increase the amount of the precipitating active element which determines the catalyst purification ability, in order to obtain the desired purification ability of the catalyst. Therefore, while the use degree of the catalyst is relatively small, it is preferred that the change of the amount of the precipitating active element is small as possible.

In this regard, according to the invention, in case that the fuel supply stop control can be performed and when the catalyst temperature is higher than or equal to the performance inhibiting temperature, the performance of the fuel supply stop control is inhibited and when the catalyst temperature is lower than the performance inhibiting temperature, the performance of the fuel supply stop control is permitted, a temperature lower than the base temperature of the performance inhibiting temperature is set as the performance inhibiting temperature while the use degree of the catalyst is smaller than or equal to a predetermined degree (that is, while the use degree of the catalyst is relatively small). Thereby, the performance opportunity of the fuel supply stop control decreases and therefore, the opportunity of the agglomeration of the composite oxide decreases and as a result, the change of the catalyst purification ability is small.

On the other hand, according to the invention, in case that the fuel supply amount increase control can be performed and when the catalyst temperature is higher than or equal to the performance permitting temperature, the performance of the fuel supply amount increase control is permitted and when the catalyst temperature is lower than the performance permitting temperature, the performance of the fuel supply amount increase control is inhibited, a temperature higher than the base temperature of the performance permitting temperature is set as the performance permitting temperature while the use degree of the catalyst is smaller than or equal to a predetermined degree (that is, while the use degree of the catalyst is relatively small). Thereby, the performance opportunity of the fuel supply amount increase control decreases and therefore, the change of the amount of the precipitating active element is small and as a result, the change of the catalyst purification ability is small.

As described above, according to the invention, while the use degree of the catalyst is relatively small, the change of the catalyst purification ability is small and therefore, the catalyst purification ability during the engine operation can be easily estimated. Thus, according to the invention, obtained is an effect that the control logic used in the engine control can be relatively easily established while the use degree of the catalyst is relatively small and the engine control can be relatively simply performed and the desired purification ability of the catalyst can be obtained while the use degree of the catalyst is relatively small.

Further, according to another invention of this application, in case that the engine can perform the fuel supply stop control in the aforementioned invention, when referring to the predetermined degree as a first degree, a temperature higher than a base temperature of the performance inhibiting temperature is set as the performance inhibiting temperature while the use degree of the catalyst is larger than the first degree and is smaller than or equal to a second degree which is a predetermined degree larger than the first degree.

According to the invention, the following effect can be obtained. That is, according to the invention, while the use degree of the catalyst is larger than the first degree and is smaller than or equal to the second degree, the temperature higher than the base temperature of the performance inhibiting temperature is set as the performance inhibiting temperature. Thereby, the performance opportunity of the fuel supply stop control increases and therefore, the agglomeration of the composite oxide is facilitated. Thus, obtained is an effect that the precipitation speed of the active element can be decreased. It should be noted that in case that such an effect is obtained, for example, the active element solid solution degree can be easily controlled to the target solid solution degree when controlling the active element solid solution degree (that is, a proportion of the active element transforming into the composite oxide relative to the total of the active element) to the target solid solution degree (that is, the target of the active element solid solution degree).

Further, according to further another invention of this application, in case that the engine can perform the fuel supply stop control in the aforementioned invention, after the use degree of the catalyst becomes larger than the second degree, the air-fuel ratio of the exhaust gas flowing into the catalyst is controlled to an air-fuel ratio leaner than the stoichiometric air-fuel ratio or the air-fuel ratio of the exhaust gas flowing into the catalyst is controlled to an air-fuel ratio richer than the stoichiometric air-fuel ratio such that the active element solid solution degree expressing a proportion of the active element transforming into the composite oxide as a solid solution relative to the total of the active element is controlled to the target solid solution degree which is the target active element solid solution degree.

According to the invention, the following effect can be obtained. During the engine operation, the catalyst temperature becomes higher than or equal to the predetermined solid solution or precipitation temperature. On the other hand, even when the catalyst flow-in exhaust air-fuel ratio is controlled to the stoichiometric air-fuel ratio, the catalyst flow-in exhaust air-fuel ratio becomes leaner or richer than the stoichiometric air-fuel ratio temporarily. In this regard, when the catalyst temperature is higher than or equal to the predetermined solid solution temperature and the catalyst flow-in exhaust air-fuel ratio becomes leaner than the stoichiometric air-fuel ratio, the atmosphere of the interior of the catalyst becomes the oxidation atmosphere and therefore, the active element transforms into the composite oxide as a solid solution in case that the active element has a property that it transforms into the composite oxide as a solid solution when the catalyst temperature is higher than or equal to the predetermined solid solution temperature and the atmosphere of the interior of the catalyst is the oxidation atmosphere. On the other hand, when the catalyst temperature is higher than or equal to the predetermined precipitation temperature and the catalyst flow-in exhaust air-fuel ratio becomes richer than the stoichiometric air-fuel ratio, the atmosphere of the interior of the catalyst becomes the reduction atmosphere and therefore, the active element precipitates from the composite oxide in case that the active element has a property that it precipitates from the composite oxide when the catalyst temperature is higher than or equal to the predetermined precipitation temperature and the atmosphere of the interior of the catalyst is the reduction atmosphere. That is, due to the change of the catalyst temperature and the catalyst flow-in exhaust air-fuel ratio during the engine operation, the amount of the precipitating active element changes and therefore, the catalyst purification ability changes. Further, when an active element use degree (that is, a degree of the use of the active element for activating the component included in the exhaust gas) increases, the active element may deteriorate and as a result, an activation ability of the active element (that is, an ability of the active element for enhancing the oxidation or reduction reaction activity of the component included in the exhaust gas) may decrease. In other words, when the use degree of the catalyst increases, the catalyst purification ability may decrease. As described above, due to the change of the activation ability of the active element during the engine operation, the catalyst purification ability may change.

Therefore, in order to obtain a desired performance of the engine, it is necessary to establish the control logic used in the engine control and perform the engine control such that the desired performance of the engine can be obtained in consideration of the change of the catalyst purification ability during the engine operation. However, the change of the catalyst purification ability during the engine operation changes depending on the manner of the engine operation and the catalyst use degree and therefore, it is very cumbersome to establish the control logic and perform the engine control as described above. On the other hand, if the change of the catalyst purification ability can be estimated independently of the manner of the engine operation and the catalyst use degree, the control logic can be relatively easily established and the engine control can be relatively simply performed.

In this regard, according to the invention, after the use degree of the catalyst becomes relatively large (that is, after the use degree of the catalyst becomes larger than the second degree), the catalyst flow-in exhaust air-fuel ratio is controlled to an air-fuel ratio leaner or richer than the stoichiometric air-fuel ratio so as to control the active element solid solution degree to the target solid solution degree. Thus, if the catalyst temperature is higher than or equal to the predetermined solid solution temperature when the catalyst flow-in exhaust air-fuel ratio is controlled to the air-fuel ratio leaner than the stoichiometric air-fuel ratio, the precipitating active element transforms into the composite oxide as a solid solution and as a result, the active element solid solution degree increases. On the other hand, if the catalyst temperature is higher than or equal to the predetermined precipitation temperature when the catalyst flow-in exhaust air-fuel ratio is controlled to the air-fuel ratio richer than the stoichiometric air-fuel ratio, the atmosphere of the interior of the catalyst becomes the reduction atmosphere and therefore, the active element transforming as a solid solution precipitates from the composite oxide and as a result, the active element solid solution degree decreases. That is, the active element solid solution degree is controlled to the target solid solution degree by controlling the catalyst flow-in exhaust air-fuel ratio appropriately depending on whether the active element solid solution degree is larger or smaller than the target solid solution degree. Thereby, the amount of the precipitating active element is maintained at a constant amount and therefore, the catalyst purification ability during the engine operation can be easily estimated. Thus, according to the invention, obtained is an effect that the control logic used in the engine control can be relatively easily established after the use degree of the catalyst becomes relatively large and the engine control can be relatively simply performed and a desired purification ability of the catalyst can be obtained even after the use degree of the catalyst becomes relatively large.

It should be noted that in the aforementioned invention, the predetermined solid solution and precipitation temperatures may be the same as or different from each other. Further, in the aforementioned invention, the target solid solution degree may be a constant value independently of conditions and may be changed depending on the conditions. Furthermore, in the aforementioned invention, the active element solid solution degree may be any active element solid solution degree obtained by any method, for example, may be an active element solid solution degree detected by a sensor for detecting the active element solid solution degree or may be an active element solid solution degree calculated on the basis of various parameters relating to the engine.

MODE FOR CARRYING OUT THE INVENTION

Figure 1:
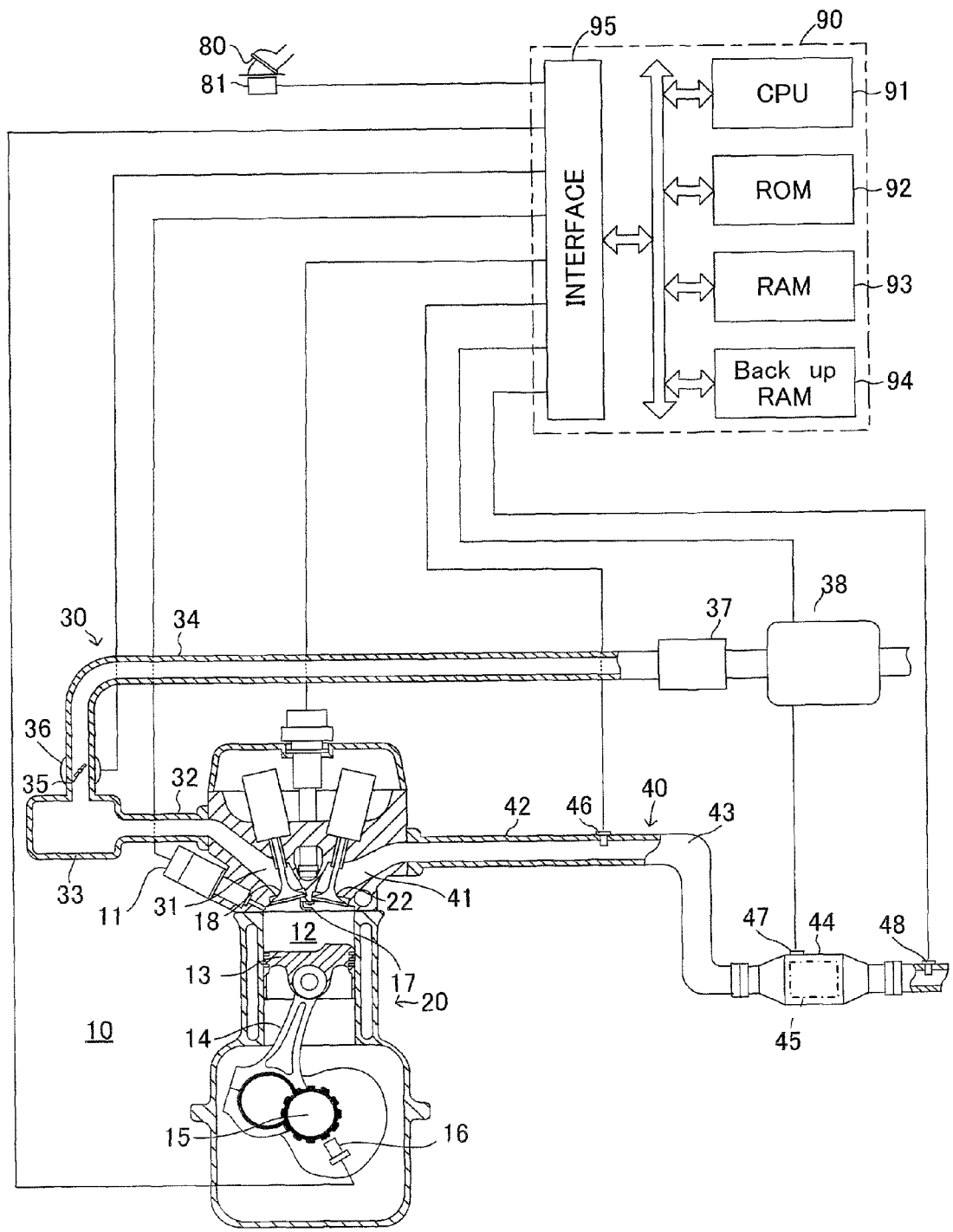
FIG. 1 is a view showing an internal combustion engine comprising an exhaust gas purification device of a first embodiment of the invention.

Below, embodiments of the invention will be described. An internal combustion engine comprising an exhaust gas purification device according to a first embodiment of the invention is shown in FIG. 1. The engine shown in FIG. 1 is a spark ignition type internal combustion engine (a so-called gasoline engine). In FIG. 1, 11 denotes a fuel injector, 12 denotes a combustion chamber, 13 denotes a piston, 14 denotes a connecting rod, 15 denotes a crank shaft, 16 denotes a crank position sensor, 17 denotes a spark plug, 18 denotes an intake valve, 20 denotes a body of the engine, 22 denotes an exhaust valve, 80 denotes an acceleration pedal and 81 denotes an acceleration pedal depression amount sensor. It should be noted that only one combustion chamber 12 is shown in FIG. 1, however, the engine 10 comprises a plurality of the combustion chambers (for example, four or six or eight combustion chambers).

Further, in FIG. 1, 30 denotes an intake passage, 31 demotes an intake port, 32 denotes an intake manifold, 33 denotes a surge tank, 34 denotes an intake pipe, 35 denotes a throttle valve, 36 denotes an actuator for driving the throttle valve 35, 37 denotes an air flow meter, 38 denotes an air cleaner, 40 denotes an exhaust passage, 41 denotes an exhaust port, 42 denotes an exhaust manifold, 43 denotes an exhaust pipe, 44 denotes a catalyst converter, 46 denotes an air-fuel ratio sensor, 47 denotes a temperature sensor and 48 denotes an air-fuel ratio sensor. It should be noted that the intake passage 30 is configured by the intake port 31, intake manifold 32, the surge tank 33 and the intake pipe 34. On the other hand, the exhaust passage 40 is configured by the exhaust port 41, the exhaust manifold 42 and the exhaust pipe 43.

The electronic control unit 90 is configured by a microcomputer. Further, the electronic control unit 90 has a CPU (a microprocessor) 91, a ROM (a read only memory) 92, a RAM (a random access memory) 93, a backup RAM 94 and an interface 95. These CPU 91, ROM 92, RAM 93, backup RAM 94 and interface 95 are connected to each other by a bidirectional bus.

Next, each element of the aforementioned engine will be described in detail. It should be noted that in the following description, a "target fuel injection timing" means a "target timing for injecting the fuel from the fuel injector", a "target fuel injection amount" means a "target amount of the fuel injected from the fuel injector", a "mixture gas" means a "gas formed in the combustion chamber and comprised of the mixed air and fuel", a "target ignition timing" means a "target timing for igniting the fuel of the mixture gas by the spark plug", an "engine speed" means a "speed of the engine", a "throttle valve opening degree" means an "opening degree of the throttle valve" a "target throttle valve opening degree" means a "target value of the throttle valve opening degree", an "intake air amount" means an "amount of the air suctioned into the combustion chamber", an "acceleration pedal depression amount" means a "depression amount of the acceleration pedal" and a "required engine torque" means a "torque required to be output from the engine".

The fuel injector 11 is mounted on the body 20 of the engine such that a fuel injection hole thereof exposes to the interior of the combustion chamber 12. Further, the fuel injector 11 is electrically connected to the interface 95 of the electronic control unit 90. The electronic control unit 90 supplies to the fuel injector 11, a command signal for injecting the fuel of the target fuel injection amount from the fuel injector 11 at the target fuel injection timing. When the command signal is supplied from the electronic control unit 90 to the fuel injector 11, the fuel injector 11 injects the fuel directly into the interior of the combustion chamber 12.

The spark plug 17 is mounted on the body 20 of the engine such that a discharge electrode thereof exposes to the interior of the combustion chamber 12. Further, the spark plug 17 is electrically connected to the interface 95 of the electronic control unit 90. The electronic control unit 90 supplies to the spark plug 17, a command signal for generating a spark by the spark plug 17 at the target ignition timing. When the command signal is supplied from the electronic control unit 90 to the spark plug 17, the spark plug 17 ignites the fuel in the combustion chamber 12. It should be noted that when the fuel in the combustion chamber 12 is ignited by the spark plug 17, the fuel in the combustion chamber 12 burns and thereby, a torque is output to the crank shaft 15 via the piston 13 and the connecting rod 14.

The crank position sensor 16 is positioned adjacent to an output shaft of the engine, that is, the crank shaft 15. Further, the crank position sensor 16 is electrically connected to the interface 95 of the electronic control unit 90. The crank position sensor 16 outputs an output value corresponding to a rotation phase of the crank shaft 15. This output value is input to the electronic control unit 90. The electronic control unit 90 calculates the engine speed on the basis of this output value.

The intake manifold 32 is divided to a plurality of pipes at its one end and these divided pipes are connected to the corresponding intake port 31. Further, the intake manifold 32 is connected to one end of the surge tank 33 at its other end. The surge tank 33 is connected to one end of the intake pipe 34 at its other end.

Throttle valve 35 is positioned in the intake pipe 34. An actuator 36 for changing an opening degree of the throttle valve (hereinafter, this actuator will be referred to as "a throttle valve actuator") is connected to the throttle valve 35. The throttle valve actuator 36 is electrically connected to the interface 95 of the electronic control unit 90. The electronic control unit 90 supplies a control signal for driving the throttle valve actuator 36 to the throttle valve actuator 36 to control the throttle valve opening degree to the target throttle valve opening degree. It should be noted that when the throttle valve opening degree is changed, a flow area in the intake pipe at an area where the throttle valve 35 is positioned changes. Thereby, an amount of an air flowing through the throttle valve 35 changes and then, the amount of the air suctioned into the combustion chamber changes.

The air flow meter 37 is positioned in the intake pipe 34 upstream of the throttle valve 35. Further, the air flow meter 37 is electrically connected to the interface 95 of the electronic control unit 90. The air flow meter 37 outputs an output value corresponding to the amount of the air flowing therethrough. This output value is input to the electronic control unit 90. The electronic control unit 90 calculates the amount of the air flowing through the air flow meter 37, that is, the intake air amount on the basis of this output value.

The air cleaner 38 is positioned in the intake pipe 34 upstream of the air flow meter 37.

The exhaust manifold 42 is divided to a plurality of pipes at its one end and these divided pipes are connected to the corresponding exhaust port 41. Further, the exhaust manifold 42 is connected to one end of the exhaust pipe 43 at its other end. The exhaust pipe 43 is open to the ambient atmosphere at its other end.

The catalyst converter 44 is positioned in the exhaust passage 40 (in particular, the exhaust pipe 43). Further, the catalyst converter 44 houses a catalyst 45 therein. This catalyst 45 can purify a particular component/components included in the exhaust gas flowing into this catalyst at a predetermined purification rate when its temperature is higher than or equal to a particular temperature (a so-called activation temperature). In particular, the catalyst 45 has an active element and a composite oxide.

The composite oxide carries the active element. Further, the composite oxide has an ability for retaining an oxygen by absorbing the oxygen therein or adsorbing the oxygen thereto when an atmosphere surrounding the composite oxide (that is, an atmosphere of the interior of the catalyst) is an oxidation atmosphere and for discharging the oxygen retained by the composite oxide therefrom when the atmosphere surrounding the composite oxide is a reduction atmosphere (hereinafter, this ability will be referred to as "an oxygen retaining/discharging ability").

The active element is an element having a property for activating at least one or both of the oxidation and reduction reactions of the particular component included in the exhaust gas flowing into the catalyst. Further, the active element has a property that it transforms into the composite oxide as a solid solution when the temperature of the catalyst (hereinafter, this temperature of the catalyst will be referred to as "a catalyst temperature") is higher than or equal to a certain temperature (hereinafter, this temperature will be referred to as "a predetermined solid solution temperature") and the atmosphere of the interior of the catalyst is the oxidation atmosphere and it precipitates from the composite oxide when the catalyst temperature is higher than or equal to a certain temperature (hereinafter, this temperature will be referred to as "a catalyst precipitation temperature") and the atmosphere of the interior of the catalyst is the reduction atmosphere. Therefore, the composite oxide is a composite oxide formed of a material having a property for transforming the active element thereinto as a solid solution when the catalyst temperature is equal to the predetermined solid solution temperature and the atmosphere of the interior of the catalyst is the oxidation atmosphere and for precipitating the active element therefrom when the catalyst temperature is higher than or equal to the catalyst precipitation temperature and the atmosphere of the interior of the catalyst is the reduction atmosphere. Therefore, in the catalyst according to the first embodiment, the active element precipitating from the composite oxide transforms into the composite oxide as a solid solution when the catalyst temperature is higher than or equal to the predetermined solid solution temperature and the air-fuel ratio of the exhaust gas flowing into the catalyst is leaner than the stoichiometric air-fuel ratio and the active element transforming into the composite oxide as a solid solution precipitates from the composite oxide when the catalyst temperature is higher than or equal to the predetermined precipitation temperature and the air-fuel ratio of the exhaust gas flowing into the catalyst is richer than the stoichiometric air-fuel ratio.

Further, the catalyst 45 is a so-called three-way catalyst which can purify a nitrogen oxide (NOx), a carbon monoxide (CO) and an unburned hydrocarbon (HC) included in the exhaust gas simultaneously at a high purification rate when the air-fuel ratio of the exhaust gas flowing thereinto is the stoichiometric air-fuel ratio. It should be noted that the air-fuel ratio of the exhaust gas means a ratio of the amount of the air suctioned into the combustion chamber 12 relative to the amount of the fuel supplied to the combustion chamber 12.

It should be noted that the active element may be any element as far as it has a property that it transforms into the composite oxide as a solid solution as described above and it precipitates from the composite oxide as described above, for example, may be a rhodium (Rh). Further, a material forming the composite oxide may be any material as far as it has a property for transforming the active element thereinto as a solid solution as described above and precipitating the active element therefrom as described above, for example, may be a composite oxide such as $MgAlO_4$ having a spinel structure, $MAl_2O_3$ (M is a metal) having a perovskite structure or the like.

Figure 2:
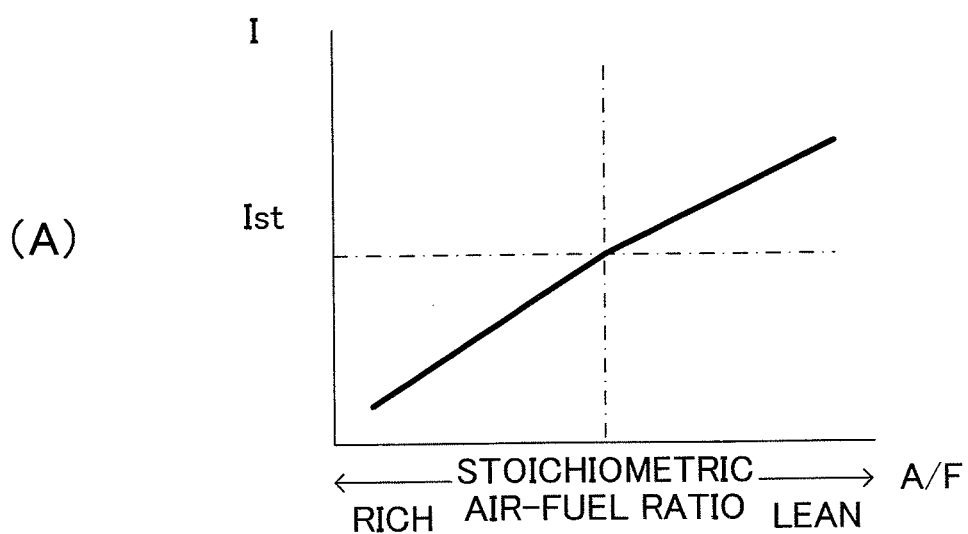
FIG. 2(A) is a view showing an output property of an upstream side air-fuel ratio sensor and FIG. 2(B) is a view showing an output property of a downstream side air-fuel ratio sensor.
Figure 2:
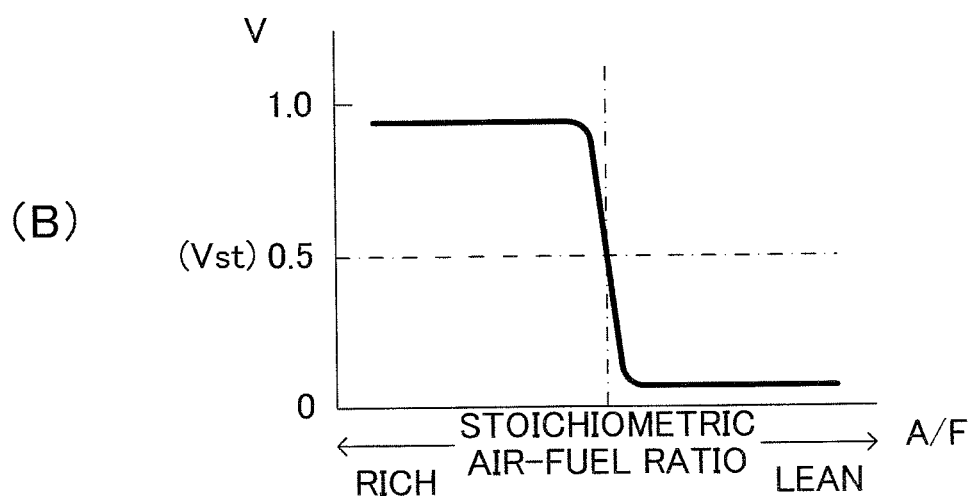

The air-fuel ratio sensor 46 is mounted on the exhaust passage 40 upstream of the catalyst 45 (hereinafter, this sensor may be refereed to as "an upstream air-fuel ratio sensor"). Further, the air-fuel ratio sensor 46 is electrically connected to the interface 95 of the electronic control unit 90. The air-fuel ratio sensor 46 outputs an output value corresponding to the air-fuel ratio of the exhaust gas reaching thereto. This output value is input to the electronic control unit 90. The electronic control unit 90 calculates the air-fuel ratio of the exhaust gas reaching to the air-fuel ratio sensor 46 on the basis of this output value. Therefore, the air-fuel ratio sensor 46 is a sensor for detecting the air-fuel ratio of the exhaust gas reaching thereto. It should be noted that the air-fuel ratio sensor 46 is not limited to a particular sensor and may be a sensor which can detect the air-fuel ratio of the exhaust gas reaching thereto, and for example, a so-called current limiting type oxygen concentration sensor having an output property shown in FIG. 2(A) may be used as the air-fuel ratio sensor 46. This oxygen concentration sensor outputs as an output value, an electric current which increases as the air-fuel ratio of the exhaust gas reaching thereto increases as shown in FIG. 2(A).

The air-fuel ratio sensor 48 is mounted on the exhaust passage 40 downstream of the catalyst 45 (hereinafter, this sensor may be refereed to as "a downstream air-fuel ratio sensor"). Further, the air-fuel ratio sensor 48 is electrically connected to the interface 95 of the electronic control unit 90. The air-fuel ratio sensor 48 outputs an output value corresponding to the air-fuel ratio of the exhaust gas reaching thereto. This output value is input to the electronic control unit 90. The electronic control unit 90 calculates the air-fuel ratio of the exhaust gas reaching to the air-fuel ratio sensor 48 on the basis of this output value. Therefore, the air-fuel ratio sensor 48 is a sensor for detecting the air-fuel ratio of the exhaust gas reaching thereto. It should be noted that the air-fuel ratio sensor 48 is not limited to a particular sensor and may be a sensor which can detect the air-fuel ratio of the exhaust gas reaching thereto, and for example, a so-called electromotive force type oxygen concentration sensor having an output property shown in FIG. 2(B) may be used as the air-fuel ratio sensor 48. This oxygen concentration sensor outputs as an output value, a relatively high constant voltage when the air-fuel ratio of the exhaust gas reaching thereto is richer than the stoichiometric air-fuel ratio and outputs as an output value, a relatively low constant voltage when the air-fuel ratio of the exhaust gas reaching thereto is leaner than the stoichiometric air-fuel ratio as shown in FIG. 2(B). In addition, this oxygen sensor outputs as an output value, a voltage intermediate between the relatively high and low constant voltages when the air-fuel ratio of the exhaust gas reaching thereto is the stoichiometric air-fuel ratio. Therefore, the output value of this oxygen sensor decreases considerably from the relatively high constant voltage to the relatively low constant voltage through the aforementioned intermediate voltage when the air-fuel ratio of the exhaust gas reaching thereto changes from the air-fuel ratio richer than the stoichiometric air-fuel ratio to the air-fuel ratio leaner than the stoichiometric air-fuel ratio. On the other hand, the output value of this oxygen sensor increases considerably from the relatively low constant voltage to the relatively high constant voltage through the aforementioned intermediate voltage when the air-fuel ratio of the exhaust gas reaching thereto changes from the air-fuel ratio leaner than the stoichiometric air-fuel ratio to the air-fuel ratio richer than the stoichiometric air-fuel ratio.

The temperature sensor 47 is mounted on the catalyst converter 44. Further, the temperature sensor 47 is electrically connected to the interface 95 of the electronic control unit 90. The temperature sensor 47 outputs an output value corresponding to the temperature of the catalyst 45. This output value is input to the electronic control unit 90. The electronic control unit 90 calculates the temperature of the catalyst 45 on the basis of this output value. Therefore, the temperature sensor 47 is a sensor for detecting the temperature of the catalyst 45.

The acceleration pedal depression amount sensor 81 is connected to the acceleration pedal 80. Further, the acceleration pedal depression amount sensor 81 is electrically connected to the interface 95 of the electronic control unit 90. The acceleration pedal depression amount sensor 81 outputs an output value corresponding to the depression amount of the acceleration pedal 80. This output value is input to the electronic control unit 90. The electronic control unit 90 calculates the depression amount of the acceleration pedal 80, that is, the required engine torque on the basis of this output value.

Next, an air-fuel ratio control according to the first embodiment will be described. It should be noted that in the following description, an "engine operation state" means an "operation state of the engine", a "fuel injection amount" means an "amount of the fuel injected from the fuel injector", a "target air-fuel ratio" means an "target air-fuel ratio of the mixture gas", an "upstream detected air-fuel ratio" means an "air-fuel ratio of the exhaust gas detected by the upstream air-fuel ratio sensor" and a "downstream detected air-fuel ratio" means an "air-fuel ratio of the exhaust gas detected by the downstream air-fuel ratio sensor".

Figure 3:
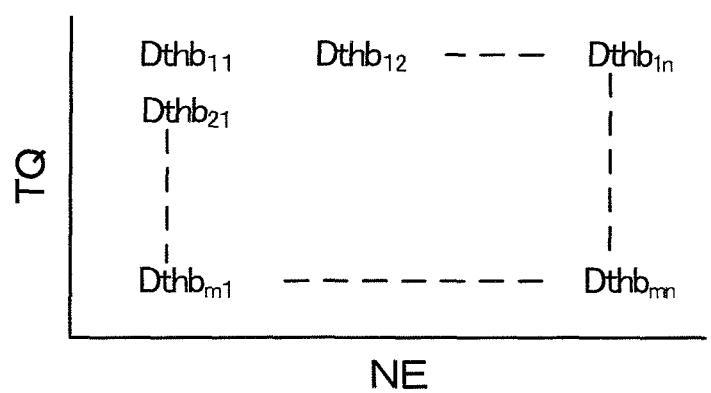
FIG. 3 is a view showing a map used for acquiring a base throttle valve opening degree during an engine operation according to the first embodiment.

According to the first embodiment, an optimum throttle valve opening degrees depending on the engine operation states are previously obtained by an experiment or the like. Then, these obtained throttle valve opening degrees are memorized in the electronic control unit as base throttle valve opening degrees Dthb in the form of a map as a function of the engine speed NE and the required engine torque TQ as shown in FIG. 3. During the engine operation, the base throttle valve opening degree Dthb corresponding to the present engine speed NE and the present required engine torque TQ is acquired from the map shown in FIG. 3. Then, the thus acquired base throttle valve opening degree Dthb is set as the target throttle valve opening degree.

Further, according to the first embodiment, a base fuel injection amount Qb is calculated according to the following formula 1, a target fuel injection amount Qt is calculated according to the following formula 2 and then, the thus calculated target fuel injection amount is set as the target fuel injection amount. It should be noted that in the following formula 1, "Ga" is the "intake air amount, "NE" is the "engine speed" and "AFt" is the "target air-fuel ratio" and in the following formula 2, "Qb" is the "base fuel injection amount calculated according to the formula 1" and "Kr" is a "correction coefficient". It should be noted that in the air-fuel ratio control according to the first embodiment, the stoichiometric air-fuel ratio is set as the target air-fuel ratio.

$$Qb=(Ga/NE)*(1/AFt) \quad (1)$$

$$Qt=Qb*Kf \quad (2)$$

It should be noted that the correction coefficient Kf in the formula 2 is set as follows. That is, while the upstream detected air-fuel ratio is larger than the stoichiometric air-fuel ratio (=the target air-fuel ratio) (that is, while the upstream detected air-fuel ratio is leaner than the stoichiometric air-fuel ratio and therefore, the air-fuel ratio of the mixture gas is leaner than the stoichiometric air-fuel ratio), the correction coefficient Kf is increased gradually by a relatively small constant value (hereinafter, this value will be referred to as "a constant increase value"). Thereby, the target fuel injection amount is increased gradually and therefore, the air-fuel ratio of the mixture gas decreases gradually to approach the stoichiometric air-fuel ratio. On the other hand, while the upstream detected air-fuel ratio is smaller than the stoichiometric air-fuel ratio (=the target air-fuel ratio) (that is, while the upstream detected air-fuel ratio is richer than the stoichiometric air-fuel ratio and therefore, the air-fuel ratio of the mixture gas is richer than the stoichiometric air-fuel ratio), the correction coefficient Kf is decreased gradually by a relatively small constant value (hereinafter, this value will be referred to as "a constant decrease value"). Thereby, the target fuel injection amount is decreased gradually and therefore, the air-fuel ratio of the mixture gas increases gradually to approach the stoichiometric air-fuel ratio.

Further, when the upstream detected air-fuel ratio changes from the air-fuel ratio larger than the stoichiometric air-fuel ratio (=the target air-fuel ratio) to the air-fuel ratio smaller than the stoichiometric air-fuel ratio (that is, when the upstream detected air-fuel ratio changes from the air-fuel ratio leaner than the stoichiometric air-fuel ratio to the air-fuel ratio richer than the stoichiometric air-fuel ratio and therefore, the air-fuel ratio of the mixture gas changes from the air-fuel ratio leaner than the stoichiometric air-fuel ratio to the air-fuel ratio richer than the stoichiometric air-fuel ratio), the correction coefficient Kf is decreased by a relatively large value (hereinafter, this value will be referred to as "a skip decrease value"). Thereby, the target fuel injection amount is decreased considerably and therefore, the air-fuel ratio of the mixture gas increases considerably to approach the stoichiometric air-fuel ratio (=the target air-fuel ratio) rapidly. On the other hand, when the upstream detected air-fuel ratio changes from the air-fuel ratio smaller than the stoichiometric air-fuel ratio (=the target air-fuel ratio) to the air-fuel ratio larger than the stoichiometric air-fuel ratio (that is, when the upstream detected air-fuel ratio changes from the air-fuel ratio richer than the stoichiometric air-fuel ratio to the air-fuel ratio leaner than the stoichiometric air-fuel ratio and therefore, the air-fuel ratio of the mixture gas changes from the air-fuel ratio richer than the stoichiometric air-fuel ratio to the air-fuel ratio leaner than the stoichiometric air-fuel ratio), the correction coefficient Kf is increased by a relatively large value (hereinafter, this value will be referred to as "a skip increase value"). Thereby, the target fuel injection amount is increased considerably and therefore, the air-fuel ratio of the mixture gas decreases considerably to approach the stoichiometric air-fuel ratio (=the target air-fuel ratio) rapidly.

It should be noted that the skip decrease and increase values used in the air-fuel ratio control according to the first embodiment are set as follows. That is, while the downstream detected air-fuel ratio is larger than the stoichiometric air-fuel ratio (=the target air-fuel ratio) (that is, while the downstream detected air-fuel ratio is leaner than the stoichiometric air-fuel ratio), the skip increase value is increased gradually by a relatively small constant value (hereinafter, this value will be referred to as "a predetermined correction value"). On the other hand, while the downstream detected air-fuel ratio is smaller than the stoichiometric air-fuel ratio (=the target air-fuel ratio) (that is, while the downstream detected air-fuel ratio is richer than the stoichiometric air-fuel ratio), the skip increase value is decreased gradually by the aforementioned predetermined correction value. Then, the skip decrease value is calculated by subtracting the skip increase value calculated as described above from a predetermined value at least larger than zero (hereinafter, this value will be referred as to "a reference value"). It should be noted that when the skip increase value calculated as described above is smaller than the reference value, the reference value is set as the skip increase value (that is, the skip increase value is limited to the reference value).

It should be noted that in the air-fuel ratio control according to the first embodiment, while the upstream detected air-fuel ratio is larger than the stoichiometric air-fuel ratio (=the target air-fuel ratio), the correction coefficient is increased gradually by the constant increase value and while the upstream detected air-fuel ratio is smaller than the stoichiometric air-fuel ratio, the correction coefficient is decreased gradually by the constant decrease value. However, in place of this, while the upstream detected air-fuel ratio is larger than or equal to the stoichiometric air-fuel ratio (=the target air-fuel ratio), the correction coefficient may be increased gradually by the constant increase value and while the upstream detected air-fuel ratio is smaller than the stoichiometric air-fuel ratio, the correction coefficient may be decreased gradually by the constant decrease value or while the upstream detected air-fuel ratio is larger than the stoichiometric air-fuel ratio (=the target air-fuel ratio), the correction coefficient may be increased gradually by the constant increase value and while the upstream detected air-fuel ratio is smaller than or equal to the stoichiometric air-fuel ratio, the correction coefficient may be decreased gradually by the constant decrease value.

Further, in the air-fuel ratio control according to the first embodiment, when the upstream detected air-fuel ratio changes from the air-fuel ratio larger than the stoichiometric air-fuel ratio (=the target air-fuel ratio) to the air-fuel ratio smaller than the stoichiometric air-fuel ratio, the correction coefficient is decreased by the skip decrease value and when the upstream detected air-fuel ratio changes from the air-fuel ratio smaller than the stoichiometric air-fuel ratio to the air-fuel ratio larger than the stoichiometric air-fuel ratio, the correction coefficient is increased by the skip increase value. However, in place of this, when the upstream detected air-fuel ratio changes from the air-fuel ratio larger than or equal to the stoichiometric air-fuel ratio (=the target air-fuel ratio) to the air-fuel ratio smaller than the stoichiometric air-fuel ratio, the correction coefficient may be decreased by the skip decrease value and when the upstream detected air-fuel ratio changes from the air-fuel ratio smaller than the stoichiometric air-fuel ratio to the air-fuel ratio larger than or equal to the stoichiometric air-fuel ratio, the correction coefficient may be increased by the skip increase value or when the upstream detected air-fuel ratio changes from the air-fuel ratio larger than the stoichiometric air-fuel ratio (=the target air-fuel ratio) to the air-fuel ratio smaller than or equal to the stoichiometric air-fuel ratio, the correction coefficient may be decreased by the skip decrease value and when the upstream detected air-fuel ratio changes from the air-fuel ratio smaller than or equal to the stoichiometric air-fuel ratio to the air-fuel ratio larger than the stoichiometric air-fuel ratio, the correction coefficient may be increased by the skip increase value.

Further, in the air-fuel ratio control according to the first embodiment, while the downstream detected air-fuel ratio is larger than the stoichiometric air-fuel ratio (=the target air-fuel ratio), the skip increase value is increased by the predetermined correction value and while the downstream detected air-fuel ratio is smaller than the stoichiometric air-fuel ratio, the skip increase value is decreased by the predetermined correction value. However, in place of this, while the downstream detected air-fuel ratio is larger than or equal to the stoichiometric air-fuel ratio (=the target air-fuel ratio), the skip increase value may be increased by the predetermined correction value and while the downstream detected air-fuel ratio is smaller than the stoichiometric air-fuel ratio, the skip increase value may be decreased by the predetermined correction value or while the downstream detected air-fuel ratio is larger than the stoichiometric air-fuel ratio (=the target air-fuel ratio), the skip increase value may be increased by the predetermined correction value and while the downstream detected air-fuel ratio is smaller than or equal to the stoichiometric air-fuel ratio, the skip increase value may be decreased by the predetermined correction value.

Next, a control of the throttle valve according to the first embodiment will be described. According to the first embodiment, during the engine operation, calculated is a control signal to be supplied to the throttle valve actuator for opening the throttle valve by the target throttle valve opening degree set as described above. Then, the thus calculated control signal is supplied to the throttle valve actuator. Thereby, the throttle valve is opened by the target throttle valve opening degree.

Next, a control of the fuel injector according to the first embodiment will be described. According to the first embodiment, during the engine operation, calculated is a command signal to be supplied to the fuel injector for injecting the fuel of the target fuel injection amount set as described above from the fuel injector and the target fuel injection timing is set (the setting of this target fuel injection timing will be described later). Then, the thus calculated command signal is supplied to the fuel injector at the aforementioned set target fuel injection timing. Thereby, the fuel of the target fuel injection amount is injected from the fuel injector at the target fuel injection timing.

The engine according to the first embodiment can perform a fuel supply stop control for stopping the supply of the fuel to the combustion chamber, that is, a so-called fuel cut control for making the fuel injection amount from the fuel injector zero. Next, this control will be described. It should be noted that in the following description, a "FC control" means the "fuel supply stop control" and a "catalyst use degree" means a "degree of the use of the catalyst for purifying the components included in the exhaust gas after a new catalyst is provided on the engine".

According to the first embodiment, when the catalyst temperature is higher than or equal to a predetermined temperature (hereinafter, this temperature will be referred to as "a performance inhibiting temperature"), the performance of the FC control is inhibited and on the other hand, when the catalyst temperature is lower than the performance inhibiting temperature, the performance of the FC control is permitted. Then, when the catalyst temperature is lower than the performance inhibiting temperature and therefore, the performance of the FC control is permitted and a particular condition is satisfied, the FC control is performed.

In this regard, according to the first embodiment, while the catalyst use degree is smaller than or equal to a predetermined degree (hereinafter, this degree will be referred to as "a first degree") (that is, while the catalyst use degree is relatively small), a temperature lower than a base temperature of the performance inhibiting temperature is set as the performance inhibiting temperature. It should be noted that the base temperature is a temperature used as the performance inhibiting temperature after the catalyst use degree becomes relatively large.

According to the first embodiment, the following effect can be obtained. That is, when the FC control is performed, the catalyst flow-in exhaust air-fuel ratio (that is, the air-fuel ratio of the exhaust gas flowing into the catalyst) becomes leaner than the stoichiometric air-fuel ratio and as a result, the atmosphere of the interior of the catalyst becomes the oxidation atmosphere. In this case, when the catalyst temperature becomes relatively high, an agglomeration of the composite oxide occurs. Therefore, the catalyst purification ability changes.

On the other hand, in order to obtain a desired performance of the engine, it is necessary to establish a control logic used in the engine control (that is, the control relating to the engine) and it is necessary to perform the engine control such that the desired performance of the engine can be obtained in consideration of the change of the catalyst purification ability during the engine operation. However, in case that the change of the catalyst purification ability occurs due to the performance of the FC control, it is very cumbersome to establish the control logic and perform the engine control as described above.

In this regard, according to the first embodiment, while the catalyst use degree is smaller than or equal to the first degree (that is, while the use degree of the catalyst is relatively small), a temperature lower than the base temperature of the performance inhibiting temperature is set as the performance inhibiting temperature. Thereby, the performance opportunity of the FC control decreases and therefore, the opportunity of the agglomeration of the composite oxide decreases and as a result, the change of the catalyst purification ability is small.

As described above, according to the first embodiment, while the catalyst use degree is relatively small, the change of the catalyst purification ability is small and therefore, the catalyst purification ability during the engine operation is easily estimated. Thus, according to the first embodiment, obtained is the effect that the control logic used in the engine control while the catalyst use degree is relatively small can be relatively easily established, the engine control can be relatively simply performed and the desired performance of the catalyst can be obtained while the catalyst use degree is relatively small.

Further, according to the first embodiment, the following effect can be obtained. That is, as described above, according to the first embodiment, while the catalyst use degree is relatively small, the change of the catalyst purification ability is small. Further, when agglomeration of the composite oxide occurs, the oxygen retaining/discharging ability thereof decreases. However, according to the first embodiment, the opportunity of the agglomeration of the composite oxide is small and therefore, the decrease of the oxygen retaining/discharging ability of the composite oxide is small. Thus, a large control gain can be used as a control gain based on the downstream detected air-fuel ratio in the air-fuel ratio control described above and therefore, obtained is the effect that the robustness of the air-fuel ratio control can be improved.

It should be noted that for example, a catalyst use time (that is, the sum of the time of use of the new catalyst for purifying the component included in the exhaust gas) or a vehicle running distance (that is, in case that the engine is used for driving the vehicle, the sum of the running distance of the vehicle after the new catalyst is provided on the engine) can be used as the catalyst use degree according to the first embodiment. Further, according to the first embodiment, the aforementioned particular condition used for the judgment of whether the FC control should be performed is, for example, a condition that the required engine torque is extremely small (in particular, the required engine torque is zero). Furthermore, according to the first embodiment, after the catalyst use degree becomes larger than the first degree, for example, the base temperature of the performance inhibiting temperature is set as the performance inhibiting temperature.

Figure 4:
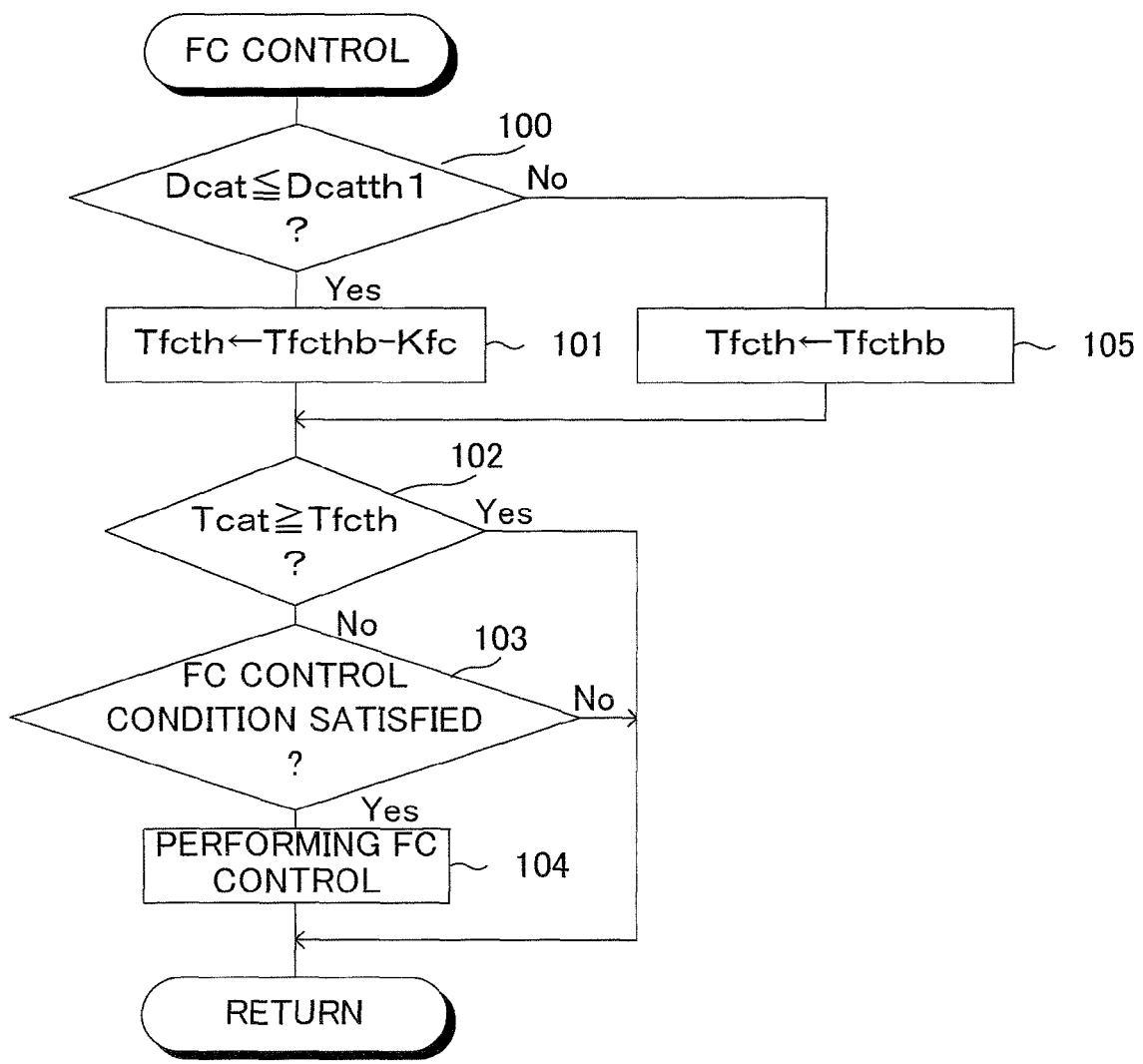
FIG. 4 is a view showing an example of a routine for performing a FC control according to the first embodiment.

Next, an example of a routine for performing the FC control according to the first embodiment will be described. The example of this routine is shown in FIG. 4. It should be noted that this routine starts at a predetermined cycle.

When the routine shown in FIG. 4 starts, first, at the step 100, it is judged if the catalyst use degree Dcat is smaller than or equal to the first degree Dcatth1 (Dcat≤Dcatth1). In this regard, when it is judged that Dcat≤Dcatth1, the routine proceeds to the step 101. On the other hand, when it is not judged that Dcat≤Dcatth1, the routine proceeds to the step 105.

At the step 101, a temperature lower than the base temperature Tfcthb of the performance inhibiting temperature by a predetermined temperature Kfc1 is set as the performance inhibiting temperature Tfcth and then, the routine proceeds to the step 102. On the other hand, at the step 105, the base temperature Tfcthb of the performance inhibiting temperature is set as the performance inhibiting temperature Tfcth and then, the routine proceeds to the step 102.

At the step 102, it is judged if the catalyst temperature Tcat is higher than or equal to the performance inhibiting temperature Tfcth (Tcat≥Tfcth). In this regard, when it is judged that Tcat≥Tfcth, the routine ends. On the other hand, when it is not judged that Tcat≥Tfcth, the routine proceeds to the step 103. It should be noted that when the routine proceeds to the step 102 from the step 101, the performance inhibiting temperature Tfcth set at the step 101 is used at the step 102 and on the other hand, when the routine proceeds to the step 102 from the step 105, the performance inhibiting temperature Tfcth set at the step 105 is used at the step 102.

At the step 103, it is judged if the FC control condition (that is, the particular condition described relating to the first embodiment) is satisfied. In this regard, when it is judged that the FC control condition is satisfied, the routine proceeds to the step 104 where the FC control is performed and then, the routine ends. On the other hand, when it is judged that the FC control condition is not satisfied, the routine ends.

Next, a second embodiment will be described. It should be noted that the configuration and the control according to the second embodiment which are not described below are the same as those according to the first embodiment or are obviously derived from those according to the first embodiment in consideration of those according to the second embodiment described below. Further, in the following description, a "base amount" means the "target fuel injection amount calculated according to the formula 2".

The engine according to the second embodiment can perform a fuel supply amount increase control for increasing the supply amount of the fuel to the combustion chamber beyond a base amount (hereinafter, this control will be simply referred to as "an amount increase control"), that is, a control for increasing the amount of the fuel injected from the fuel injector beyond the base amount. According to the second embodiment, when the catalyst temperature is higher than or equal to a predetermined temperature (hereinafter, this temperature will be referred to as "a performance permitting temperature"), the performance of the amount increase control is permitted and on the other hand, when the catalyst temperature is lower than the performance permitting temperature, the performance of the amount increase control is inhibited. Then, when the catalyst temperature is higher than or equal to the performance permitting temperature and therefore, the performance of the amount increase control is permitted and a particular condition is satisfied, the amount increase control is performed.

In this regard, according to the second embodiment, while the catalyst use degree is smaller than or equal to a predetermined degree (hereinafter, this degree will be referred to as "a first degree") (that is, while the catalyst use degree is relatively small), a temperature higher than a base temperature of the performance permitting temperature is set as the performance permitting temperature. It should be noted that the base temperature is a temperature used as the performance permitting temperature after the catalyst use degree becomes relatively large. Further, the first degree may be the same as or different from the first degree according to the first embodiment.

According to the second embodiment, the following effect can be obtained. That is, when the amount increase control is performed, the catalyst flow-in exhaust air-fuel ratio becomes richer than the stoichiometric air-fuel ratio and as a result, the atmosphere of the interior of the catalyst becomes the reduction atmosphere. In this regard, when the catalyst temperature becomes higher than or equal to the predetermined precipitation temperature, the precipitation of the active element from the composite oxide occurs. That is, the amount of the precipitating active element (that is, the active element precipitating from the composite oxide) changes and therefore, the catalyst purification ability changes.

On the other hand, in order to obtain a desired performance of the engine, as described above, it is necessary to establish the control logic used in the engine control and perform the engine control such that the desired performance of the engine can be obtained in consideration of the change of the catalyst purification ability during the engine operation.

However, in case that the change of the catalyst purification ability occurs due to the performance of the amount increase control, it is very cumbersome to establish the control logic and perform the engine control as described above. Also, while the use degree of the catalyst is relatively small, the deterioration of the catalyst does not progress and therefore, in order to obtain a desired purification ability of the catalyst, it is not necessary to increase the amount of the precipitating active element which determines the catalyst purification ability. That is, while the use degree of the catalyst is relatively small, it is preferred that the change of the amount of the precipitating active element is small as possible.

In this regard, according to the second embodiment, while the catalyst use degree is smaller than or equal to the first degree (that is, while the use degree of the catalyst is relatively small), a temperature higher than the base temperature of the performance permitting temperature is set as the performance permitting temperature. Thereby, the performance opportunity of the amount increase control decreases and therefore, the change of the amount of the precipitating active element is small and as a result, the change of the catalyst purification ability is small.

As described above, according to the second embodiment, while the use degree of the catalyst is relatively small, the change of the catalyst purification ability is small and therefore, the catalyst purification ability during the engine operation can be estimated easily. Thus, according to the second embodiment, obtained is the effect that the control logic used in the engine control while the catalyst use degree is relatively small can be relatively easily established, the engine control can be relatively simply performed and the desired performance of the catalyst can be obtained while the catalyst use degree is relatively small.

It should be noted that for example, the catalyst use time or the vehicle running distance can be used as the catalyst use degree according to the second embodiment. Further, according to the second embodiment, the aforementioned particular condition used for the judgment of whether the amount increase control should be performed is, for example, a condition that the engine speed is very high and the required engine torque is very large. Further, according to the second embodiment, after the catalyst use degree becomes larger than the first degree, for example, the base temperature of the performance permitting temperature is set as the performance permitting temperature.

Furthermore, the FC control according to the first embodiment may be used in the second embodiment. In this case, while the catalyst use degree is smaller than or equal to the first degree described relating to the first embodiment, a temperature lower than the base temperature of the performance inhibiting temperature is set as the performance inhibiting temperature. It should be noted that the first degree used in the FC control may be the same as or different from the first degree used in the amount increase control according to the second embodiment.

Figure 5:
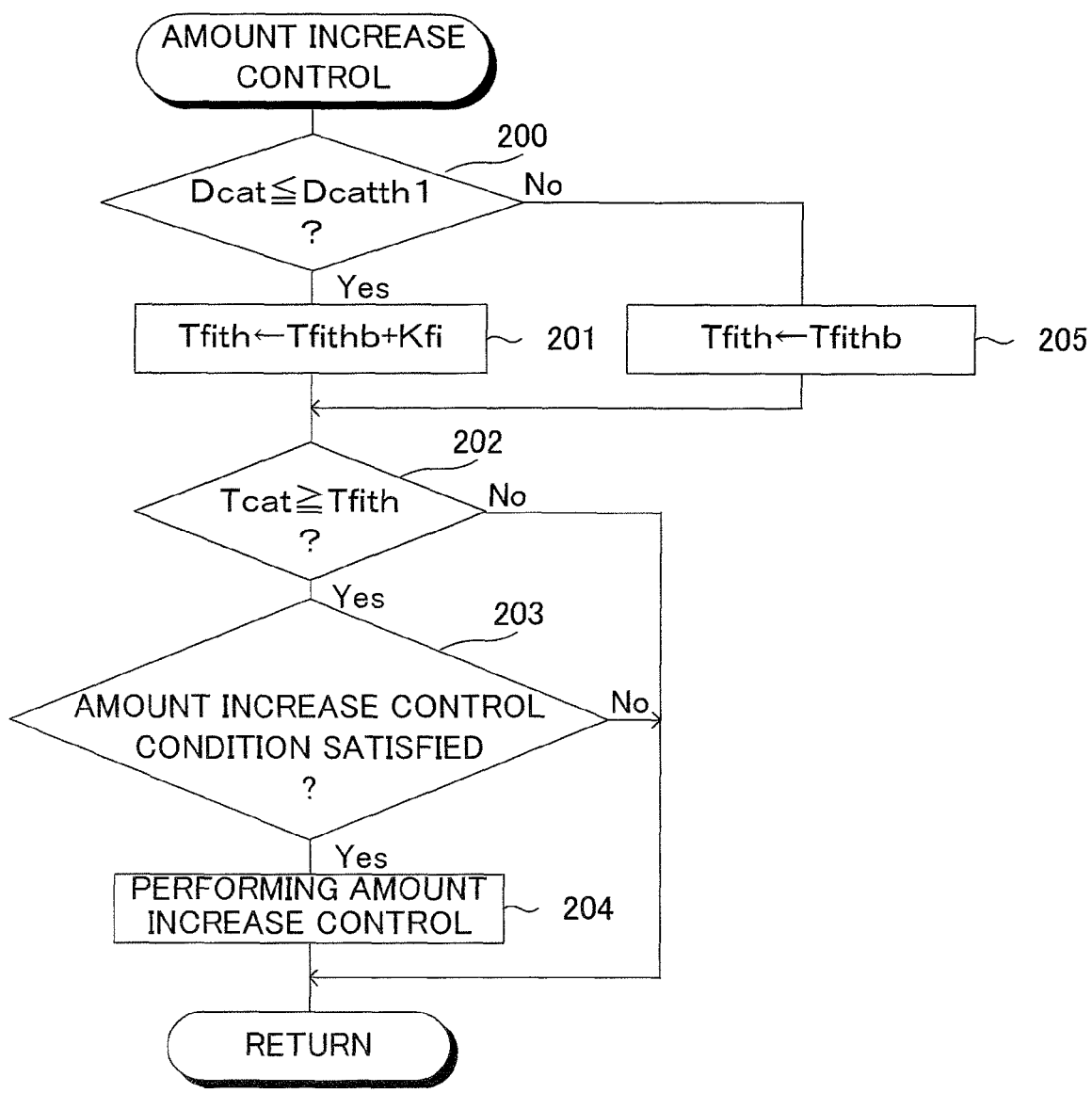
FIG. 5 is a view showing an example of a routine for performing an amount increase control according to a second embodiment.

Next, an example of a routine for performing the amount increase control according to the second embodiment will be described. The example of this routine is shown in FIG. 5. It should be noted that this routine starts at a predetermined cycle.

When the routine shown in FIG. 5, first, at the step 200, it is judged if the catalyst use degree Dcat is smaller than or equal to the first degree Dcatth1 (Dcat≤Dcatth1). In this regard, when it is judged that Dcat≤Dcatth1, the routine proceeds to the step 201. On the other hand, when it is not judged that Dcat≤Dcatth1, the routine proceeds to the step 205.

At the step 201, a temperature higher than the base temperature Tfithb of the performance permitting temperature by a predetermined temperature Kfi is set as the performance permitting temperature Tfith and then, the routine proceeds to the step 202. On the other hand, at the step 205, the base temperature Tfithb of the performance permitting temperature is set as the performance permitting temperature Tfith and then, the routine proceeds to the step 202.

At the step 202, it is judged if the catalyst temperature Tcat is higher than or equal to the performance permitting temperature Tfith (Tcat≥Tfith). In this regard, when it is judged that Tcat≥Tfith, the routine proceeds to the step 203. On the other hand, when it is not judged that Tcat≥Tfith, the routine ends. It should be noted that when the routine proceeds to the step 202 from the step 201, the performance permitting temperature Tfith set at the step 201 is used at the step 202 and on the other hand, when the routine proceeds to the step 202 from the step 205, the performance permitting temperature Tfith set at the step 205 is used at the step 202.

At the step 203, it is judged if the amount increase control condition (that is, the particular condition described relating to the second embodiment) is satisfied. In this regard, when it is judged that the amount increase control condition is satisfied, the routine proceeds to the step 204 where the amount increase control is performed and then, the routine ends. On the other hand, when it is judged that the amount increase control condition is not satisfied, the routine ends.

Next, a third embodiment will be described. It should be noted that the configuration and the control according to the third embodiment which are not described below are the same as those according to the aforementioned embodiments or are obviously derived from those according to the aforementioned embodiments in consideration of those according to the third embodiment described below. Further, in the following description, a "performance inhibiting temperature" means the "performance inhibiting temperature described relating to the first embodiment".

According to the third embodiment, while the catalyst use degree is smaller than or equal to a predetermined degree (hereinafter, this degree will be referred to as "a first degree"), a temperature lower than a base temperature of the performance inhibiting temperature is set as the performance inhibiting temperature. Further, while the catalyst use degree is larger than the first degree and is smaller than or equal to another predetermined degree larger than the first degree (hereinafter, this degree will be referred to as "a second degree"), a temperature higher than the base temperature of the performance inhibiting temperature is set as the performance inhibiting temperature.

According to the third embodiment, the following effect can be obtained. That is, according to the third embodiment, while the catalyst use degree is larger than the first degree and is smaller than or equal to the second degree, the temperature higher than the base temperature of the performance inhibiting temperature is set as the performance inhibiting temperature. Thereby, the performance opportunity of the fuel supply stop control increases and therefore, the agglomeration of the composite oxide is facilitated. Thus, obtained is an effect that the precipitation speed of the active element can be decreased. It should be noted that in case that such an effect is obtained, for example, when controlling the active element solid solution degree (that is, the proportion of the active element transforming into the composite oxide as a solid solution relative to the total of the active element) to a target solid solution degree (that is, the target active element solid solution degree), obtained is an effect that the active element solid solution degree can be easily controlled to the target solid solution degree. Further, the agglomeration of the composite oxide is facilitated and therefore, the oxygen retaining/discharging ability of the composite oxide decreases. That is, the oxygen retaining/discharging ability of the composite oxide is stabilized at a small degree. Thus, in case that the aforementioned air-fuel ratio control is performed, a large control gain can be used as a control gain based on the downstream detected air-fuel ratio and therefore, obtained is an effect that the robustness of the air-fuel ratio control can be improved.

It should be noted that the first degree according to the third embodiment may be the same as or different from the first degree according to the first embodiment. Further, according to the third embodiment, after the catalyst use degree becomes larger than the second degree, for example, the base temperature of the performance inhibiting temperature is set as the performance inhibiting temperature.

Further, in the third embodiment, the amount increase control according to the second embodiment may be used. In this case, while the catalyst use degree is smaller than or equal to the first degree described relating to the second embodiment, a temperature higher than the base temperature of the performance permitting temperature is set as the performance permitting temperature. It should be noted that the first degree used in the amount increase control may be the same as or different from the first degree used in the FC control according to the third embodiment.

Figure 6:
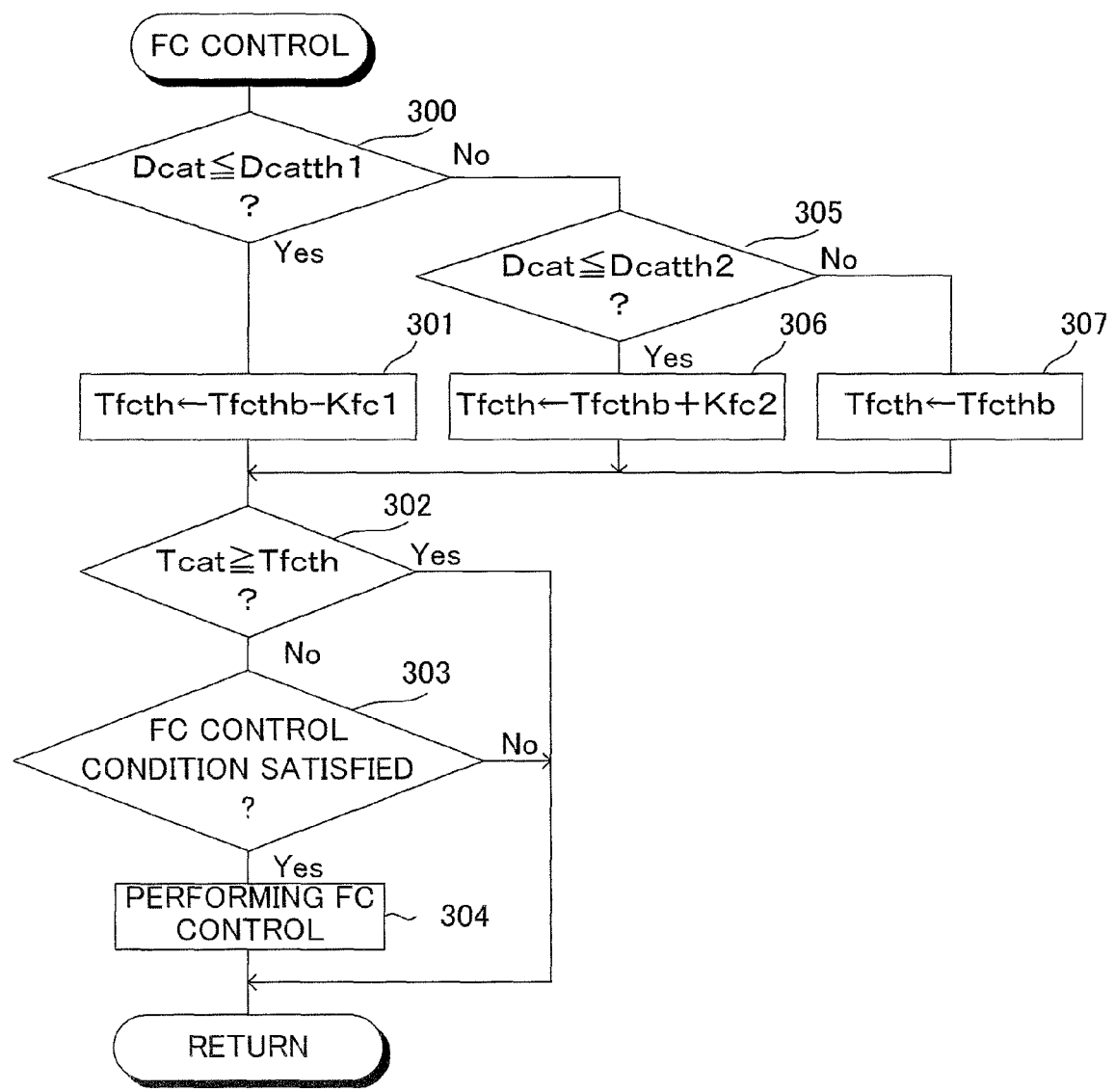
FIG. 6 is a view showing an example of the routine for performing the FC control according to a third embodiment.

Next, an example of a routine for performing the FC control according to the third embodiment will be described. The example of this routine is shown in FIG. 6. It should be noted that this routine starts at a predetermined cycle.

When the routine shown in FIG. 6 starts, first, at the step 300, it is judged if the catalyst use degree Dcat is smaller than or equal to the first degree Dcatth1 (Dcat≤Dcatth1). In this regard, when it is judged that Dcat≤Dcatth1, the routine proceeds to the step 301. On the other hand, when it is not judged that Dcat≤Dcatth1, the routine proceeds to the step 305.

At the step 305, it is judged if the catalyst use degree Dcat is smaller than or equal to the second degree Dcatth2 (Dcat≤Dcatth2). In this regard, when it is judged that Dcat≤Dcatth2, the routine proceeds to the step 306. On the other hand, when it is not judged that Dcat≤Dcatth2, the routine proceeds to the step 307.

At the step 301, a temperature lower than the base temperature Tfcthb of the performance inhibiting temperature by a predetermined temperature Kfc1 is set as the performance inhibiting temperature Tfcth and then, the routine proceeds to the step 302. Further, at the step 306, a temperature higher than the base temperature Tfcthb of the performance inhibiting temperature by a predetermined temperature Kfc2 is set as the performance inhibiting temperature Tfcth and then, the routine proceeds to the step 302. Furthermore, at the step 307, the base temperature Tfcthb of the performance inhibiting temperature is set as the performance inhibiting temperature Tfcth and then, the routine proceeds to the step 302. It should be noted that the predetermined temperature Kfc2 may be the same as or different from the predetermined temperature Kfc1.

At the step 302, it is judged if the catalyst temperature Tcat is higher than or equal to the performance inhibiting temperature Tfcth (Tcat≥Tfcth). In this regard, when it is judged that Tcat≥Tfcth, the routine ends. On the other hand, when it is not judged that Tcat≥Tfcth, the routine proceeds to the step 303. It should be noted that when the routine proceeds to the step 302 from the step 301, the performance inhibiting temperature Tfcth set at the step 301 is used at the step 302, when the routine proceeds to the step 302 from the step 306, the performance inhibiting temperature Tfcth set at the step 306 is used at the step 302 and when the routine proceeds to the step 302 from the step 307, the performance inhibiting temperature Tfcth set at the step 307 is used at the step 302.

At the step 303, it is judged if the FC control condition (that is, the particular condition described relating to the first embodiment) is satisfied. In this regard, when it is judged that the FC control condition is satisfied, the routine proceeds to the step 304 where the FC control is performed and then, the routine ends. On the other hand, when it is not judged that the FC control condition is not satisfied, the routine ends.

Next, a fourth embodiment will be described. It should be noted that the configuration and the control according to the fourth embodiment which are not described below are the same as those according to the aforementioned embodiments or are obviously derived from those according to the aforementioned embodiments in consideration of those according to the fourth embodiment described below. Further, in the following description, the "active element solid solution degree" means a "proportion of the active element transforming into the composite oxide relative to the total of the active element".

According to the fourth embodiment, while the catalyst use degree is smaller than or equal to a predetermined degree (hereinafter, this degree will be referred to as "a first degree"), a temperature lower than a base temperature of the performance inhibiting temperature is set as the performance inhibiting temperature. Further, while the catalyst use degree is larger than the first degree and is smaller than or equal to another predetermined degree larger than the first degree (hereinafter, this degree will be referred to as "a third degree"), a temperature higher than the base temperature of the performance inhibiting temperature is set as the performance inhibiting temperature. Then, after the catalyst use degree becomes larger than the second degree, performed is a control for controlling the catalyst flow-in exhaust air-fuel ratio to an air-fuel ratio leaner than the stoichiometric air-fuel ratio or controlling the catalyst flow-in exhaust air-fuel ratio to an air-fuel ratio richer than the stoichiometric air-fuel ratio such that the active element solid solution degree is controlled to the target solid solution degree (hereinafter, this air-fuel ratio control will be referred to as "a solid solution degree control").

According to the fourth embodiment, the following effect can be obtained. That is, during the engine operation, the catalyst temperature becomes higher than or equal to the predetermined solid solution temperature or becomes equal to the predetermined precipitation temperature. On the other hand, even when the catalyst flow-in exhaust air-fuel ratio is controlled to the stoichiometric air-fuel ratio, the catalyst flow-in exhaust air-fuel ratio becomes leaner than the stoichiometric air-fuel ratio temporarily or becomes richer than the stoichiometric air-fuel ratio temporarily. In this regard, if the catalyst flow-in exhaust air-fuel ratio becomes leaner than the stoichiometric air-fuel ratio when the catalyst temperature is higher than or equal to the predetermined solid solution temperature, the atmosphere of the interior of the catalyst becomes the oxidation atmosphere and therefore, in case that the active element has a property that it transforms into the composite oxide as a solid solution when the catalyst temperature is higher than or equal to the predetermined solid solution temperature and the atmosphere of the interior of the catalyst is the oxidation atmosphere, the active element transforms into the composite oxide as a solid solution. On the other hand, if the catalyst flow-in exhaust air-fuel ratio becomes richer than the stoichiometric air-fuel ratio when the catalyst temperature is higher than or equal to the predetermined precipitation temperature, the atmosphere of the interior of the catalyst becomes the reduction atmosphere and therefore, in case that the active element has a property that it precipitates from the composite oxide when the catalyst temperature is higher than or equal to the predetermined precipitation temperature and the atmosphere of the interior of the catalyst is the reduction atmosphere, the active element precipitates from the composite oxide. That is, due to the changes of the catalyst temperature and the catalyst flow-in exhaust air-fuel ratio during the engine operation, the amount of the precipitating active element changes and therefore, the catalyst purification ability changes. Further, when an active element use degree (that is, a degree of the use of the active element for activating the components included in the exhaust gas) increases, the active element may deteriorate and as a result, an activation ability of the active element (that is, an ability of the active element for enhancing the oxidation or reduction reaction activity of the components included in the exhaust gas) may decrease. In other words, when the catalyst use degree increases, the catalyst purification ability may decrease. As described above, due to the change of the activation ability of the active element during the engine operation, the catalyst purification ability may change.

Therefore, in order to obtain a desired performance of the engine, it is necessary to establish the control logic used in the engine control and perform the engine control such that the desired performance of the engine can be obtained in consideration of the change of the catalyst purification ability during the engine operation. However, the change of the catalyst purification ability during the engine operation changes depending on the manner of the engine operation and the catalyst use degree and therefore, it is very cumbersome to establish the control logic and perform the engine control as described above. On the other hand, if the change of the catalyst purification ability can be estimated independently of the manner of the engine operation and the catalyst use degree, the control logic can be relatively easily established and the engine control can be relatively simply performed.

In this regard, according to the fourth embodiment, after the catalyst use degree becomes relatively large (that is, after the catalyst use degree becomes larger than the second degree), the catalyst flow-in exhaust air-fuel ratio is controlled to an air-fuel ratio leaner or richer than the stoichiometric air-fuel ratio so as to control the active element solid solution degree to the target solid solution degree. Thus, if the catalyst temperature is higher than or equal to the predetermined solid solution temperature when the catalyst flow-in exhaust air-fuel ratio is controlled to the air-fuel ratio leaner than the stoichiometric air-fuel ratio, the precipitating active element transforms into the composite oxide as a solid solution and as a result, the active element solid solution degree increases. On the other hand, if the catalyst temperature is higher than or equal to the predetermined precipitation temperature when the catalyst flow-in exhaust air-fuel ratio is controlled to the air-fuel ratio richer than the stoichiometric air-fuel ratio, the atmosphere of the interior of the catalyst becomes the reduction atmosphere and therefore, the active element transforming as a solid solution precipitates from the composite oxide and as a result, the active element solid solution degree decreases. That is, the active element solid solution degree is controlled to the target solid solution degree by controlling the catalyst flow-in exhaust air-fuel ratio appropriately depending on whether the active element solid solution degree is larger or smaller than the target solid solution degree. Thereby, the amount of the precipitating active element is maintained at a constant amount and therefore, the catalyst purification ability during the engine operation can be easily estimated. Thus, according to the fourth embodiment, obtained is an effect that the control logic used in the engine control can be relatively easily established after the catalyst use degree becomes relatively large and the engine control can be relatively simply performed and a desired purification ability of the catalyst can be obtained even after the catalyst use degree becomes relatively large.

It should be noted that the first degree according to the fourth embodiment may be the same as or different from the first degree according to the first embodiment or may be the same as or different from the first degree according to the second embodiment. Further, the second degree according to the fourth embodiment may be the same as or different from the second degree according to the second embodiment. Furthermore, according to the fourth embodiment, after the catalyst use degree becomes larger than the second degree, for example, the base temperature of the performance inhibiting temperature is set as the performance inhibiting temperature.

Further, in the fourth embodiment, the amount increase control according to the second embodiment may be used. In this case, while the catalyst use degree is smaller than or equal to the first degree described relating to the second embodiment, a temperature higher than the base temperature of the performance permitting temperature is set as the performance permitting temperature. It should be noted that the first degree used in the amount increase control may be the same as or different from the first degree used in the FC control according to the fourth embodiment.

Furthermore, in the solid solution degree control according to the fourth embodiment, when the catalyst flow-in exhaust air-fuel ratio should be controlled to an air-fuel ratio leaner than the stoichiometric air-fuel ratio, for example, the fuel injection amount is decreased to an amount smaller than the target fuel injection amount and on the other hand, when the catalyst flow-in exhaust air-fuel ratio should be controlled to an air-fuel ratio richer than the stoichiometric air-fuel ratio, for example, the fuel injection amount is increased to an amount larger than the target fuel injection amount. Otherwise, in the solid solution degree control according to the fourth embodiment, when the catalyst flow-in exhaust air-fuel ratio should be controlled to an air-fuel ratio leaner than the stoichiometric air-fuel ratio, for example, the throttle valve opening degree is controlled to a degree larger than the target throttle valve opening degree (that is, the intake air amount is increased) and on the other hand, when the catalyst flow-in exhaust air-fuel ratio should be controlled to an air-fuel ratio richer than the stoichiometric air-fuel ratio, for example, the throttle valve opening degree is controlled to a degree smaller than the target throttle valve opening degree (that is, the intake air amount is decreased).

Further, in the solid solution degree control according to the fourth embodiment, in particular, when the active element solid solution degree is smaller than the target solid solution degree, the catalyst flow-in exhaust air-fuel ratio is controlled to an air-fuel ratio leaner than the stoichiometric air-fuel ratio, when the active element solid solution degree is larger than the target solid solution degree, the catalyst flow-in exhaust air-fuel ratio is controlled to an air-fuel ratio richer than the stoichiometric air-fuel ratio and when the active element solid solution degree is equal to the target solid solution degree, the catalyst flow-in exhaust air-fuel ratio is controlled to the stoichiometric air-fuel ratio.

Further, it is preferred that a condition that the catalyst temperature is higher than or equal to the predetermined solid solution temperature is added as a condition for controlling the catalyst flow-in exhaust air-fuel ratio to an air-fuel ratio leaner than the stoichiometric air-fuel ratio when the active element solid solution degree is smaller than the target solid solution degree. That is, in this case, when the active element solid solution degree is smaller than the target solid solution degree and the catalyst temperature is higher than or equal to the predetermined solid solution temperature, the catalyst flow-in exhaust air-fuel ratio is controlled to an air-fuel ratio leaner than the stoichiometric air-fuel ratio and on the other hand, when the active element solid solution degree is smaller than the target solid solution degree, however, the catalyst temperature is lower than the predetermined solid solution temperature, the catalyst flow-in exhaust air-fuel ratio is controlled to the stoichiometric air-fuel ratio. Further, it is preferred that a condition that the catalyst temperature is higher than or equal to the predetermined precipitation temperature is added as a condition for controlling the catalyst flow-in exhaust air-fuel ratio to an air-fuel ratio richer than the stoichiometric air-fuel ratio when the active element solid solution degree is larger than the target solid solution degree. That is, in this case, when the active element solid solution degree is larger than the target solid solution degree and the catalyst temperature is higher than or equal to the predetermined precipitation temperature, the catalyst flow-in exhaust air-fuel ratio is controlled to an air-fuel ratio richer than the stoichiometric air-fuel ratio and on the other hand, when the active element solid solution degree is larger than the target solid solution degree, however, the catalyst temperature is lower than the predetermined precipitation temperature, the catalyst flow-in exhaust air-fuel ratio is controlled to the stoichiometric air-fuel ratio.

Further, in case that a method for decreasing the fuel injection amount to an amount smaller than the target fuel injection amount is used in order to control the catalyst flow-in exhaust air-fuel ratio to an air-fuel ratio leaner than the stoichiometric air-fuel ratio in the fourth embodiment, when the fuel injection amount is decreased to an amount considerably smaller than the target fuel injection amount, the air-fuel ratio of the mixture gas (that is, the air-fuel ratio of the mixture gas formed in the combustion chamber) may become an air-fuel ratio considerably leaner than the stoichiometric air-fuel ratio and as a result, the emission property relating to the exhaust gas may decrease. Therefore, in order to suppress the decrease of the emission property relating to the exhaust gas, in case that a method for decreasing the fuel injection amount to an amount smaller than the target fuel injection amount in order to control the catalyst flow-in exhaust air-fuel ratio to an air-fuel ratio leaner than the stoichiometric air-fuel ratio is used in the fourth embodiment, it is preferred that the fuel injection amount is about the target fuel injection amount. Further, in case that a method for increasing the fuel injection amount to an amount larger than the target fuel injection amount is used in order to control the catalyst flow-in exhaust air-fuel ratio to an air-fuel ratio richer than the stoichiometric air-fuel ratio in the fourth embodiment, when the fuel injection amount is increased to an amount considerably larger than the target fuel injection amount, the air-fuel ratio of the mixture gas may become an air-fuel ratio considerably richer than the stoichiometric air-fuel ratio and as a result, the emission property relating to the exhaust gas may decrease and the fuel consumption may increase. Therefore, in order to suppress the decrease of the emission property relating to the exhaust gas and the increase of the fuel consumption, in case that a method for increasing the fuel injection amount to an amount larger than the target fuel injection amount in order to control the catalyst flow-in exhaust air-fuel ratio to an air-fuel ratio richer than the stoichiometric air-fuel ratio is used in the fourth embodiment, it is preferred that the fuel injection amount is about the target fuel injection amount.

Further, according to the fourth embodiment, when the active element solid solution degree is smaller than the target solid solution degree, the catalyst flow-in exhaust air-fuel ratio is controlled to an air-fuel ratio leaner than the stoichiometric air-fuel ratio. However, in place of this, a target range of the active element solid solution degree is set as a target solid solution degree range and then, when the active element solid solution degree is smaller than a lower limit value of the target solid solution degree range, the catalyst flow-in exhaust air-fuel ratio may be controlled to an air-fuel ratio leaner than the stoichiometric air-fuel ratio. It should be noted that in this case, when the active element solid solution degree is within the target solid solution degree range, the catalyst flow-in exhaust air-fuel ratio is controlled to the stoichiometric air-fuel ratio. Furthermore, according to the fourth embodiment, when the active element solid solution degree is larger than the target solid solution degree, the catalyst flow-in exhaust air-fuel ratio is controlled to an air-fuel ratio richer than the stoichiometric air-fuel ratio. However, in place of this, a target range of the active element solid solution degree is set as a target solid solution degree range and then, when the active element solid solution degree is larger than an upper limit value of the target solid solution degree range, the catalyst flow-in exhaust air-fuel ratio may be controlled to an air-fuel ratio richer than the stoichiometric air-fuel ratio. It should be noted that in this case, when the active element solid solution degree is within the target solid solution degree range, the catalyst flow-in exhaust air-fuel ratio is controlled to the stoichiometric air-fuel ratio.

Figure 7:
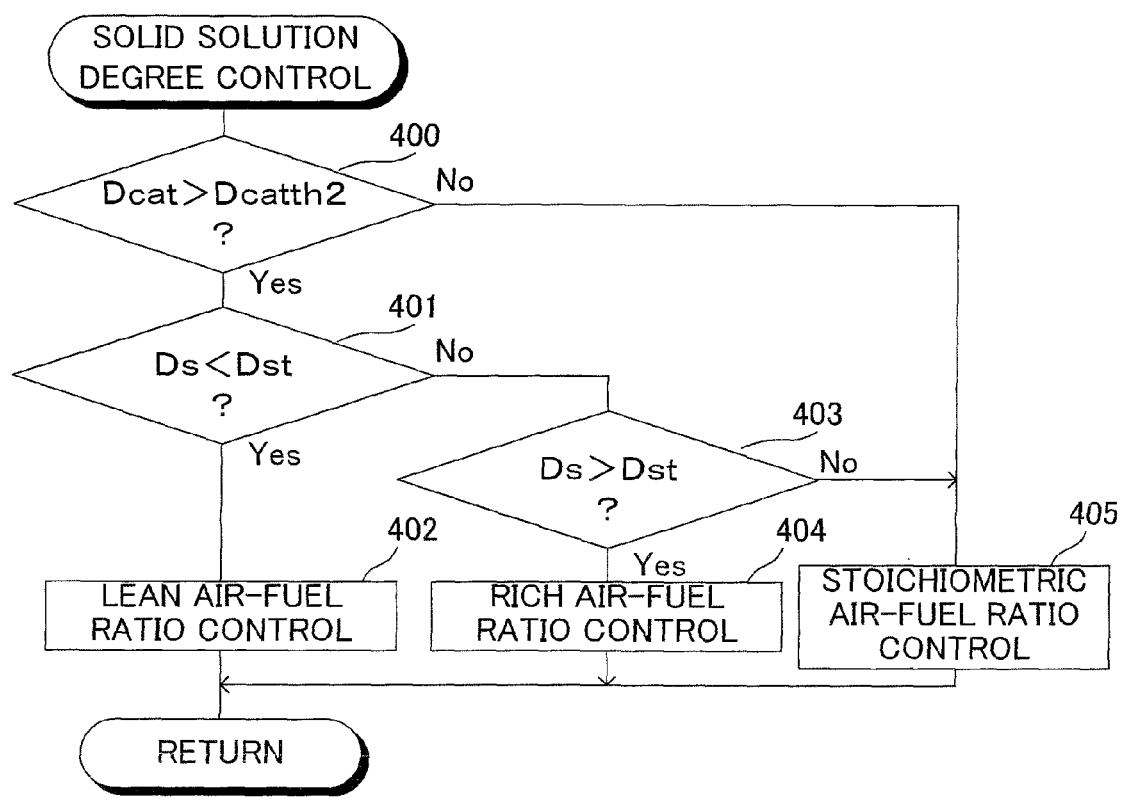
FIG. 7 is a view showing an example of a routine for performing a solid solution degree control according to a fourth embodiment.

Next, an example of a routine for performing the solid solution degree control according to the fourth embodiment will be described. The example of this routine is shown in FIG. 7. It should be noted that this routine starts at a predetermined cycle. Further, the routine shown in FIG. 6 may be used as the routine for performing the FC control according to the fourth embodiment.

When the routine shown in FIG. 7 starts, first, at the step 400, it is judged if the catalyst use degree Dcat is larger than the second degree Dcatth2 (Dcat>Dcatth2). In this regard, when it is judged that Dcat>Dcatth2, the routine proceeds to the step 401. On the other hand, when it is not judged that Dcat>Dcatth2, the routine proceeds to the step 405.

At the step 401, it is judged if the active element solid solution degree Ds is smaller than the target solid solution degree Dst (Ds<Dst). In this regard, when it is judged that Ds<Dst, the routine proceeds to the step 402. On the other hand, when it is not judged that Ds<Dst, the routine proceeds to the step 403.

At the step 403, it is judged if the active element solid solution degree Ds is larger than the target solid solution degree Dst (Ds>Dst). In this regard, when it is judged that Ds>Dst, the routine proceeds to the step 404. On the other hand, when it is not judged that Ds>Dst, the routine proceeds to the step 405.

At the step 402, the catalyst flow-in exhaust air-fuel ratio is controlled to an air-fuel ratio leaner than the stoichiometric air-fuel ratio and then, the routine ends. Further, at the step 404, the catalyst flow-in exhaust air-fuel ratio is controlled to an air-fuel ratio richer than the stoichiometric air-fuel ratio and then, the routine ends. Furthermore, at the step 405, the catalyst flow-in exhaust air-fuel ratio is controlled to the stoichiometric air-fuel ratio and then, the routine ends.

It should be noted that the aforementioned embodiments are those in which the invention is applied to the spark ignition type internal combustion engine (a so-called gasoline engine), however, the invention can be applied to an internal combustion engine other than the spark ignition type engine,

The invention claimed is:

1. An exhaust gas purification device of an internal combustion engine, comprising:
   1) a fuel supply device for supplying fuel to a combustion chamber;
   2) an exhaust passage communicating with said combustion chamber;
   3) a catalyst positioned in said exhaust passage for purifying a component included in exhaust gas, wherein said catalyst comprises:
   an active element for activating an oxidation reaction or a reduction reaction of said component, and
   a composite oxide which carries said active element,
   said active element transforming into said composite oxide as a solid solution when a temperature of said catalyst is higher than or equal to a predetermined solid solution temperature and an atmosphere of an interior of said catalyst is an oxidation atmosphere, and
   said active element precipitating from said composite oxide when said temperature is higher than or equal to a predetermined precipitation temperature and said atmosphere is a reduction atmosphere; and
   4) a catalyst temperature detection device for detecting a temperature of said catalyst,
   said exhaust gas purification device including an electronic control unit programmed to perform at least one of a first control and a second control,
   said first control being programmed to:
   a) set a temperature lower than a base inhibiting temperature as a predetermined inhibiting temperature when a use degree of said catalyst is smaller than or equal to a first predetermined degree;
   b) inhibit said fuel supply device from stopping a supply of said fuel to said combustion chamber when said catalyst temperature is higher than or equal to said predetermined inhibiting temperature; and
   c) permit said fuel supply device to stop said supply of said fuel to said combustion chamber when said catalyst temperature is lower than said predetermined inhibiting temperature, and
   said second control being programmed to:
   d) set a temperature higher than a base permitting temperature as a predetermined permitting temperature when said use degree is smaller than or equal to said first predetermined degree;
   e) permit said fuel supply device to increase an amount of said fuel supplied to said combustion chamber beyond a base fuel supply amount when said catalyst temperature is higher than or equal to said predetermined permitting temperature; and
   f) inhibit said fuel supply device from increasing said amount of said fuel beyond said base fuel supply amount when said catalyst temperature is lower than said predetermined permitting temperature.

2. The device as set forth in claim 1, wherein said first control is further programmed to set a temperature higher than said base inhibiting temperature as said predetermined inhibiting temperature when said use degree is larger than said first predetermined degree and smaller than a second predetermined degree larger than said first predetermined degree.

3. The device as set forth in claim 2, wherein said electronic control unit is further programmed to:
   decrease said amount of said supply of said fuel from said fuel supply device to make an air-fuel of a mixture gas formed in said combustion chamber leaner than a stoichiometric air-fuel ratio to make an air-fuel ratio of said exhaust gas flowing into said catalyst when said use degree is larger than said second predetermined degree and an active element solid solution degree expressing a proportion of said active element which transforms into said composite oxide as a solid solution relative to a total of said active element is smaller than a target solid solution degree; and
   increase said amount of said supply of said fuel from said fuel supply device to make said air-fuel ratio of said mixture gas richer than said stoichiometric air-fuel ratio to make said air-fuel ratio of said exhaust gas flowing into said catalyst when said use degree is larger than said second predetermined degree and said active element solid solution degree is larger than said target solid solution degree.

* * * * *